INVENTOR.
RALPH H. WISE
BY
WILSON, SETTLE & CRAIG
ATTORNEYS

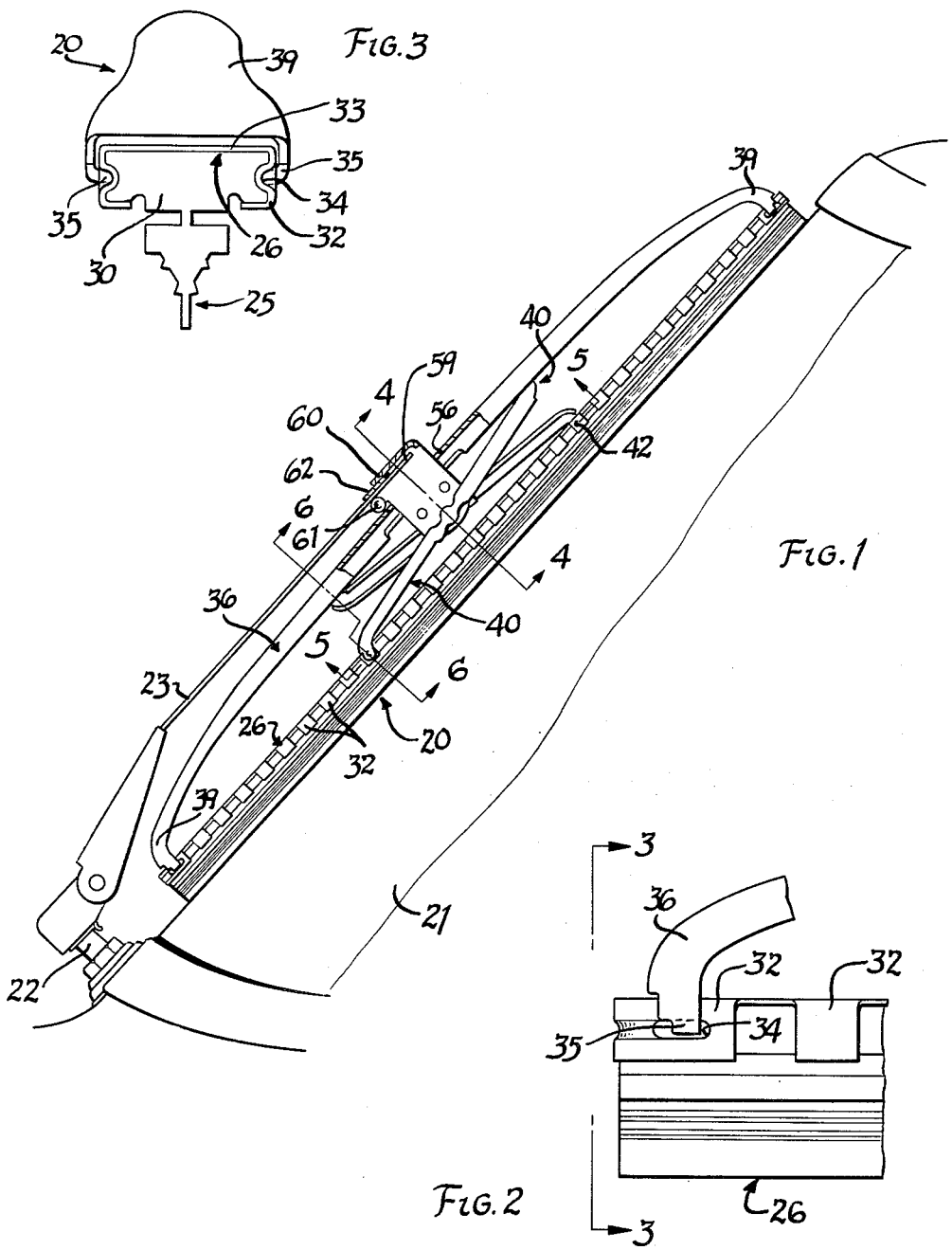

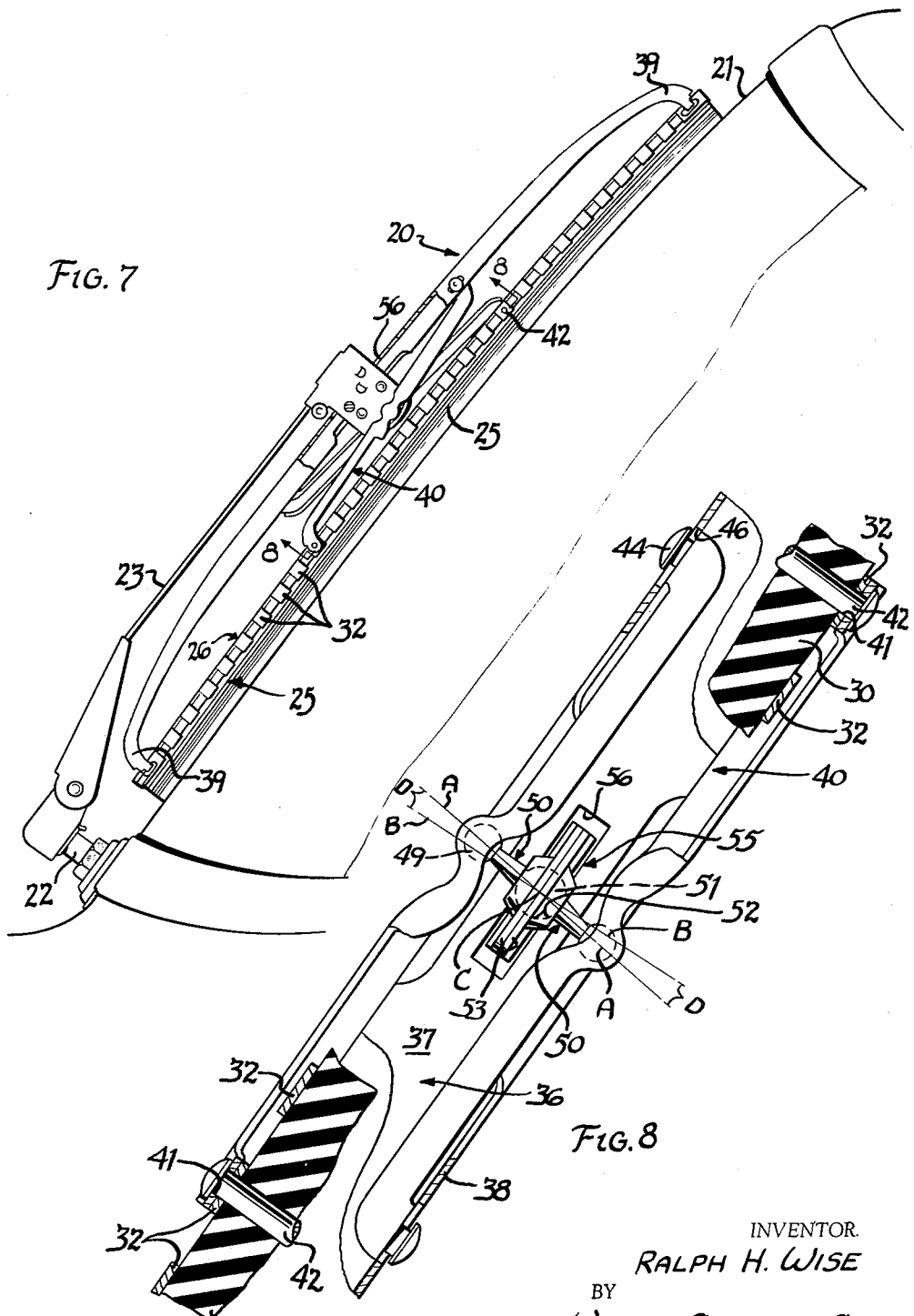

Nov. 23, 1965    R. H. WISE    3,218,664
WINDSHIELD WIPER BLADE
Filed Nov. 1, 1963    9 Sheets-Sheet 4

INVENTOR.
RALPH H. WISE
BY
WILSON, SETTLE & CRAIG
ATTORNEYS

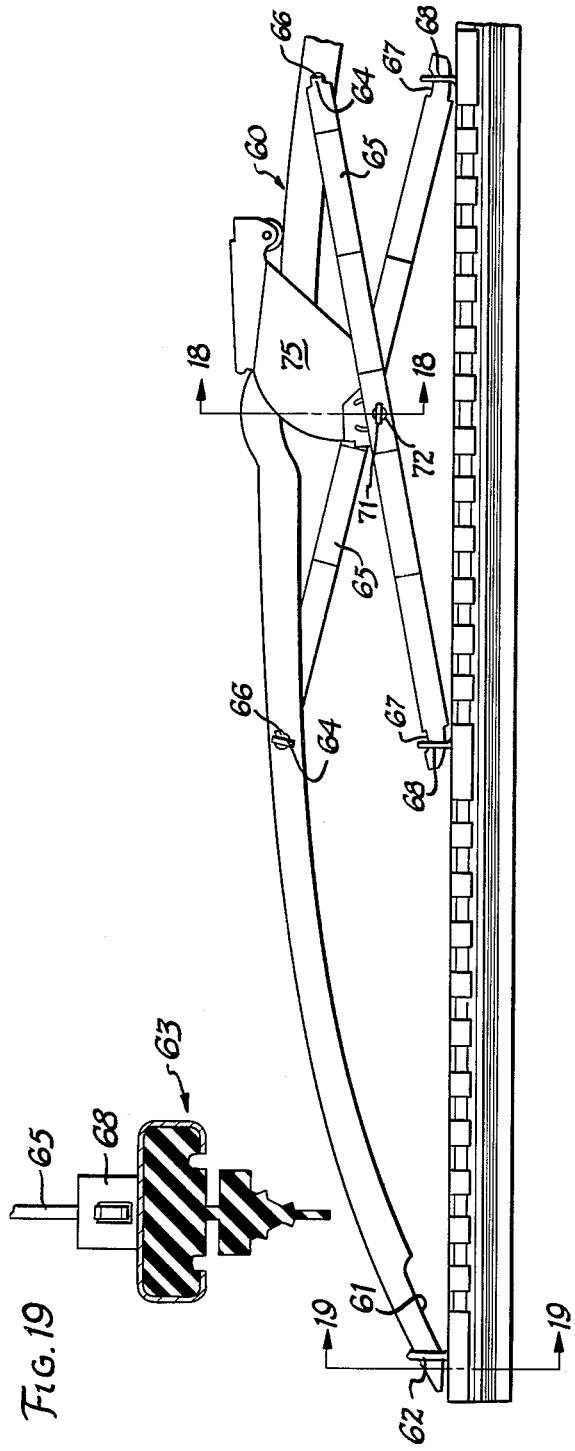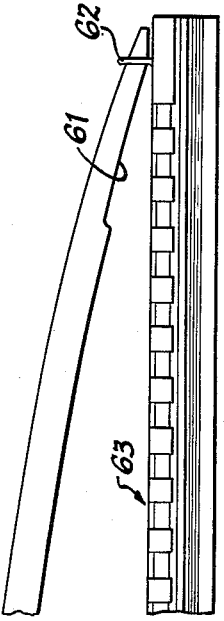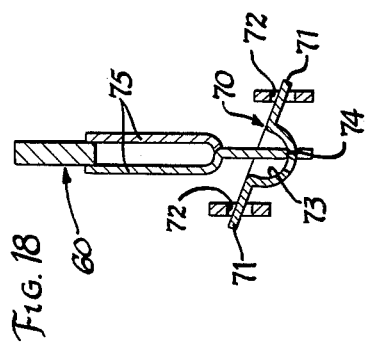

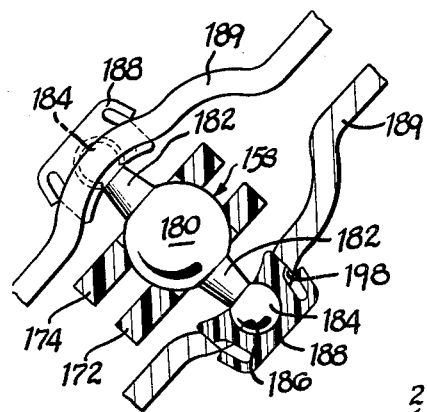
FIG. 27
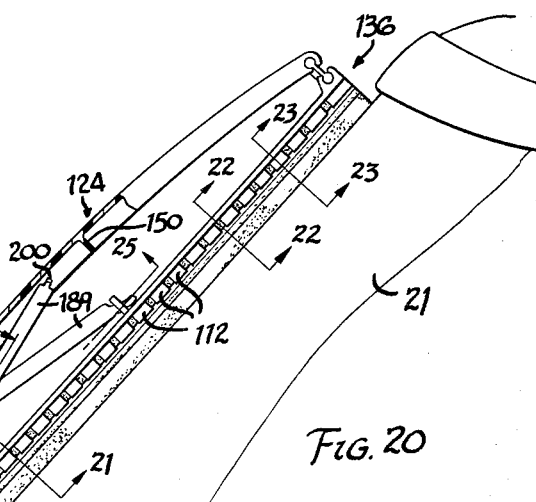
FIG. 20
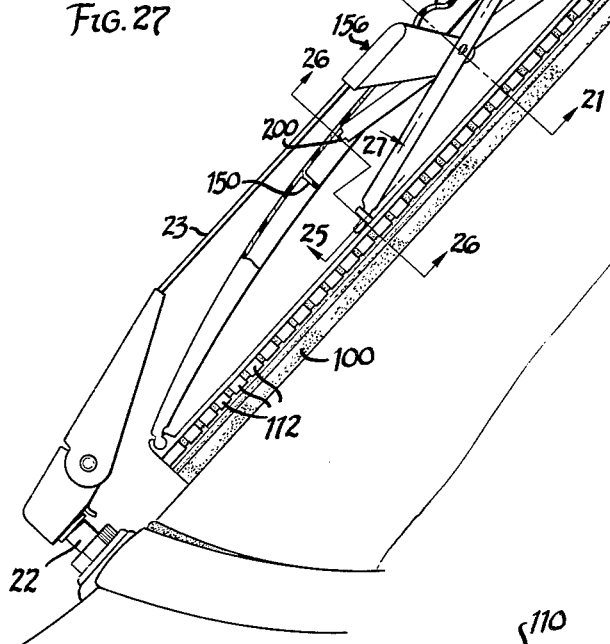
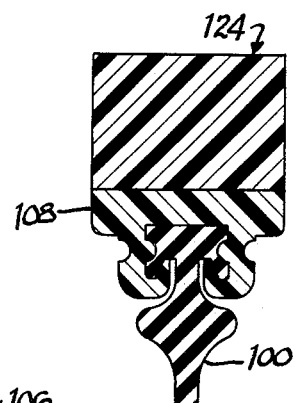
FIG. 24
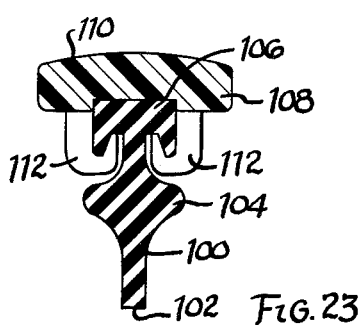
FIG. 23
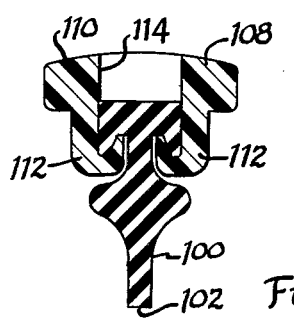
FIG. 22
INVENTOR.
RALPH H. WISE
BY
WILSON, SETTLE & CRAIG
ATTORNEYS

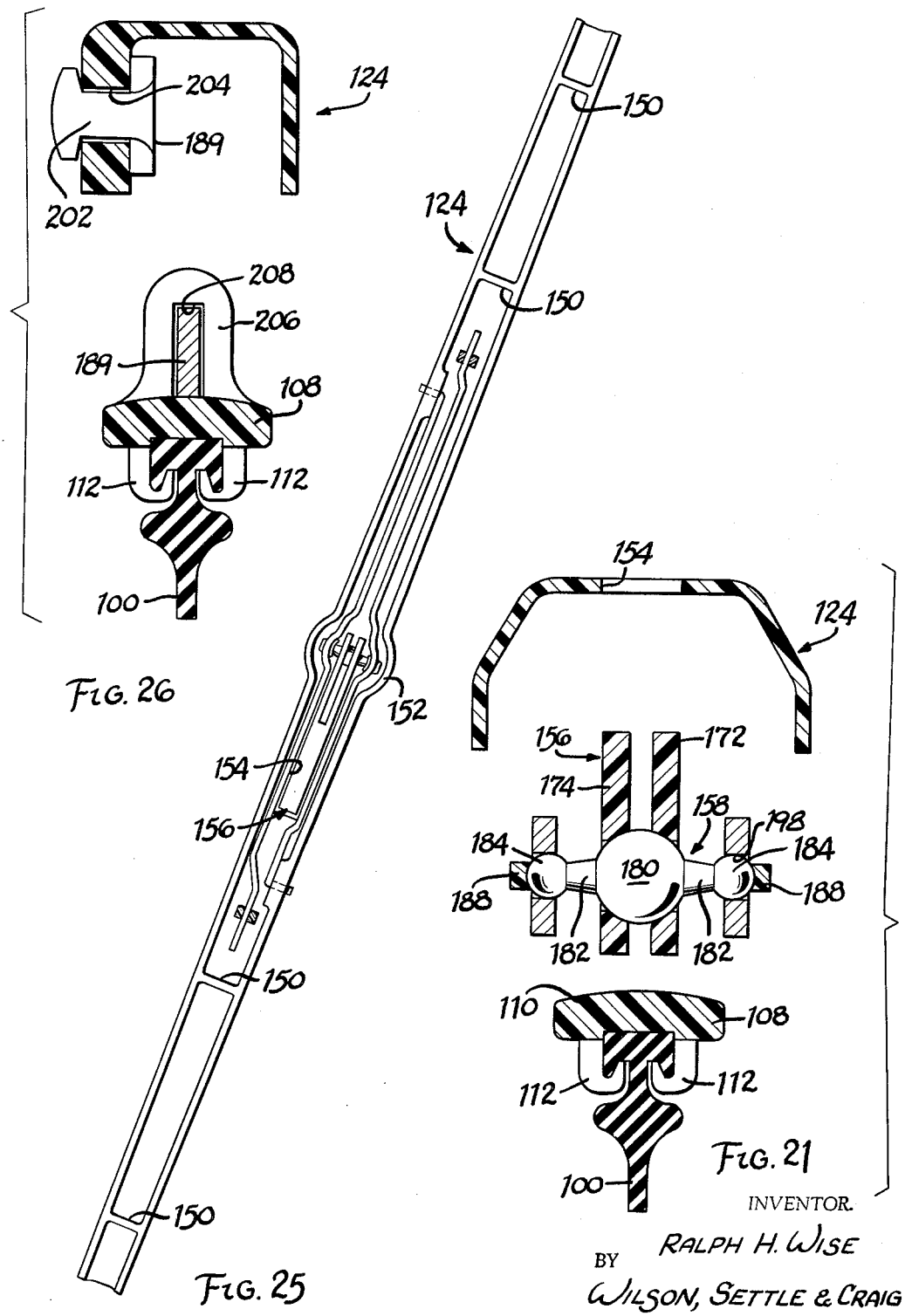

Nov. 23, 1965 R. H. WISE 3,218,664
WINDSHIELD WIPER BLADE
Filed Nov. 1, 1963 9 Sheets-Sheet 8
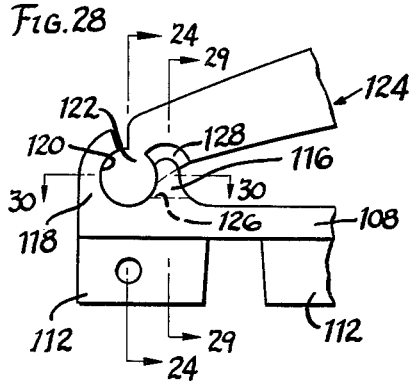
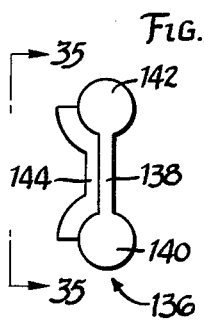
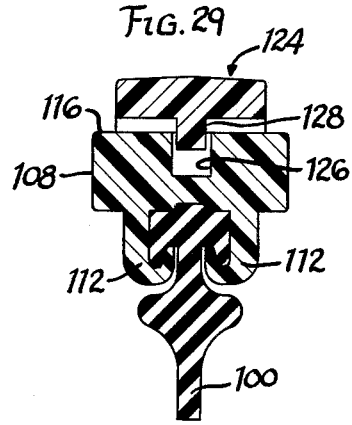
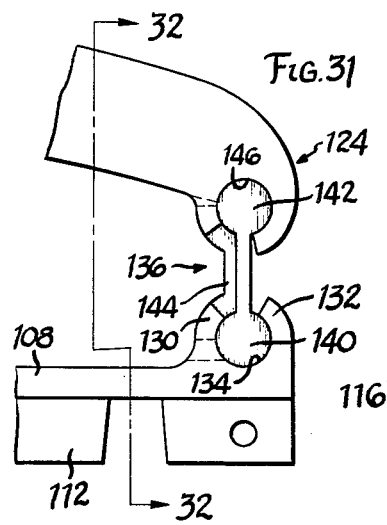
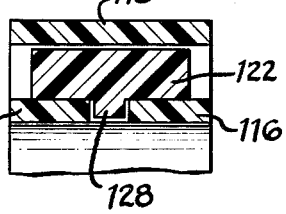
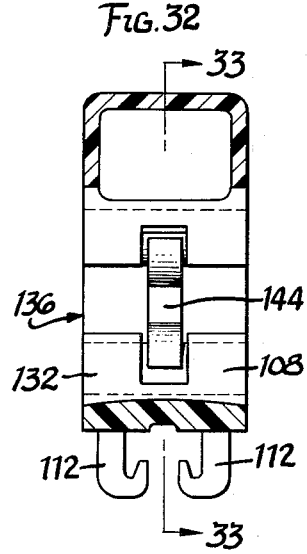
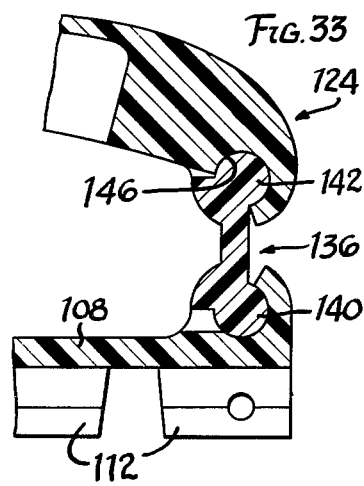
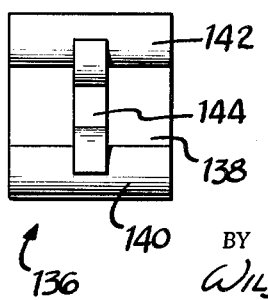
INVENTOR.
RALPH H. WISE
BY
WILSON, SETTLE & CRAIG
ATTORNEYS

INVENTOR.
RALPH H. WISE
BY
WILSON, SETTLE & CRAIG
ATTORNEYS

United States Patent Office 3,218,664
Patented Nov. 23, 1965

3,218,664
WINDSHIELD WIPER BLADE
Ralph H. Wise, 26235 W. Warren Ave., Dearborn, Mich.
Filed Nov. 1, 1963, Ser. No. 321,997
17 Claims. (Cl. 15—250.42)

This application is a continuation-in-part of my application, Serial No. 252,337, filed January 18, 1963, now abandoned.

The present invention relates to a windshield wiper blade and more particularly to a windshield wiper blade conformable to a curved windshield surface under a load applied to a bearing surface interconnecting a pair of cross arms, the load being transmitted to a wiping element by the cross arms.

In conventional windshield wiper blades for utilization in wiping a curved windshield surface, an oscillatable wiper arm applies a load to the wiper blade to urge the blade against a windshield surface by means of a plurality of pivotally connected yokes. The load applied to a primary yoke is subdivided into partial loads which are applied through secondary yokes to spaced locations along the length of the elastomeric wiping element. The wiping element is thus forced against the wiping surface at a plurality of isolated points.

The windshield wiper blade of the present invention constitutes a radical departure from this conventional construction in that the load of the oscillatable wiper arm is applied to a bearing surface interposed between a pair of individual cross arms which interconnect a rigid backing element and the wiping element. The cross arms thus define an "X-type" linkage. The bearing surface thus serves as the point of force application, this force being applied to the wiper elements by the cross arms themselves and by the rigid backing element urged toward the windshield surface by the cross arms.

The bearing surface is at least partially spheroidal and the cross arms are relatively movable with respect to one another and with respect to both the wiping element and the backing element in order to orient themselves relative to the bearing surface, so that the wiping element can conform to a curved surface with the cross arms assuming relative positions necessary to accommodate such conformation. Additionally, the bearing surface supports the entire wiping element for movement relative to the arm, so that the "rise and fall" of the blade during oscillation of the arm will further accommodate the blade to the surface being wiped.

It is, therefore, an important object of the present invention to provide an improved windshield wiper blade assembly in which a wiper arm load is applied to a bearing surface interconnecting a pair of cross arms for transmittal to a wiping element by the cross arms.

Another important object of the present invention is the provision of a windshield wiper blade including a wiping element and a superstructure for interconnecting the wiping element to an oscillatable wiper arm, the superstructure including a cross arm linkage interposed between a backing element and the wiping element, the cross arms being relatively movable about a common pivot center to which the wiper arm is attached.

A further object of the invention is the provision of a wiper blade including a rigid backing member, an X-type linkage interconnecting the backing member and a wiping element, and bearing means located at the linkage to which a load is applied for urging the wiping element into wiping contact with a windshield.

It is another object of the invention to provide a wiper assembly which employs a substantial number of molded plastic elements.

Still another object of the invention is to provide a wiper assembly wherein the number of individual parts required is substantially reduced by constructing certain of the parts from molded plastic material.

Yet another, and no less important, object of the present invention is the provision of a windshield wiper blade capable of conforming to a curved windshield surface and including a centrally located pivot point to which the load of an oscillatable wiper arm is applied and about which a pair of cross arms are relatively movable to interconnect a wiping element and a rigid backing element.

Other objects of this invention will appear in the following description and appended claims, reference being had to the accompanying drawings forming a part of this specification wherein like reference characters designate corresponding parts in the several views.

On the drawings:

FIGURE 1 is a side elevational view of a windshield wiper blade of the present invention utilized in conjunction with a wiper arm and a windshield;

FIGURE 2 is an enlarged fragmentary elevational view similar to FIGURE 1 illustrating one end of the wiper blade;

FIGURE 3 is an end elevational view taken along the plane 3—3 of FIGURE 2;

FIGURE 7 is a view similar to FIGURE 1, illustrating the blade in a different operative position;

FIGURE 8 is an enlarged sectional view taken along the plane 8—8 in FIGURE 7;

FIGURE 17 is an enlarged side elevational view of a modified form of windshield wiper blade;

FIGURE 18 is a sectional view taken along the plane 18—18 of FIGURE 17;

FIGURE 19 is an enlarged sectional view taken along the plane 19—19 of FIGURE 17;

FIGURE 20 is an enlarged side elevational view of another form of windshield wiper blade assembly wherein substantially all of the elements are constructed from plastic materials;

FIGURE 21 is a cross sectional view of the wiper of FIGURE 20 taken on line 21—21 of FIGURE 20;

Figure 36:
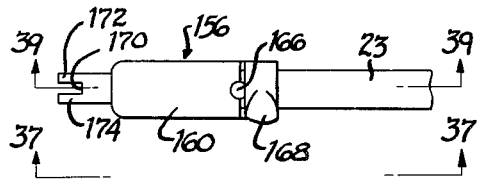
Figure 37:
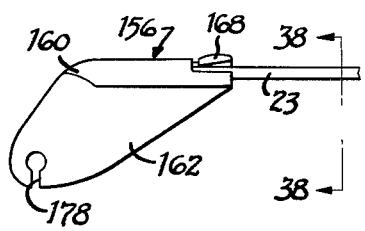
Figure 38:
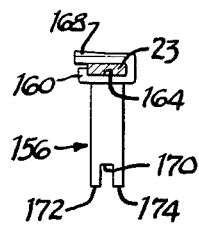
Figure 39:
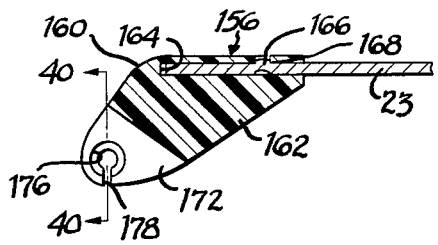
Figure 40:
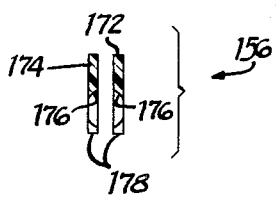
Figure 41:
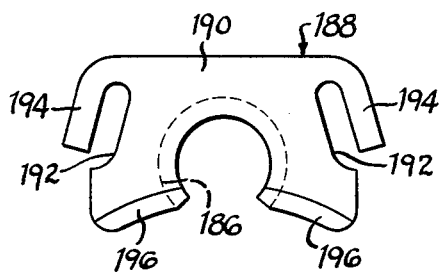
Figure 42:
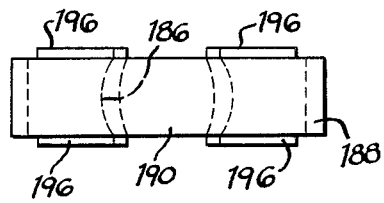

FIGURES 22 and 23 are detail cross sectional views of the carrier element taken respectively on lines 22—22 and 23—23 of FIGURE 20;

FIGURE 24 is a detail cross sectional view of the carrier element taken on line 24—24 of FIGURE 28;

FIGURE 25 is a detail cross sectional view taken on line 25—25 of FIGURE 20;

FIGURE 26 is a detail cross sectional view taken on line 26—26 of FIGURE 20;

FIGURE 27 is a detail cross sectional view taken on line 27—27 of FIGURE 20;

FIGURE 28 is a detail side elevational view showing the interconnection between one end of the backing element and carrier element of the wiper of FIGURE 20;

FIGURE 29 is a detail cross sectional view taken on line 29—29 of FIGURE 28;

FIGURE 30 is a detail cross sectional view taken on line 30—30 of FIGURE 28;

FIGURE 31 is a detail side elevational view of the interconnection between the opposite ends of the backing and carrier elements of the wiper of FIGURE 20;

FIGURE 32 is a detail end elevational view of the structure of FIGURE 31;

FIGURE 33 is a detail cross sectional view taken on line 33—33 of FIGURE 32;

FIGURE 34 is a detail side elevational view of the link of FIGURES 31 through 33;

FIGURE 35 is a detail end view of the link of FIGURE 34;

FIGURE 36 is a detail plan view of the wiper arm end and a connector element of the assembly of FIGURE 20;

FIGURE 37 is a side elevational view of the structure shown in FIGURE 36;

FIGURE 38 is a set cross sectional view taken on line 38—38 of FIGURE 37;

FIGURE 39 is a detail cross sectional view taken on line 39—39 of FIGURE 36;

FIGURE 40 is a detail cross sectional view taken on line 40—40 of FIGURE 39;

FIGURE 41 is a detail side elevational view of a plastic clip employed to couple the cross arms to the bearing assembly; and FIGURE 42 is a detail top plan view of the plastic clip of FIGURE 41.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown on the drawings:

In FIGURE 1, reference numeral 20 refers generally to a windshield wiper of the present invention.

This windshield wiper is utilized in conjunction with a windshield surface 21 having mounted at the lower cowl section thereof a pivot shaft 22 driven by suitable, well known means and serving to oscillate with windshield arm 23 across the windshield surface.

Figure 4:
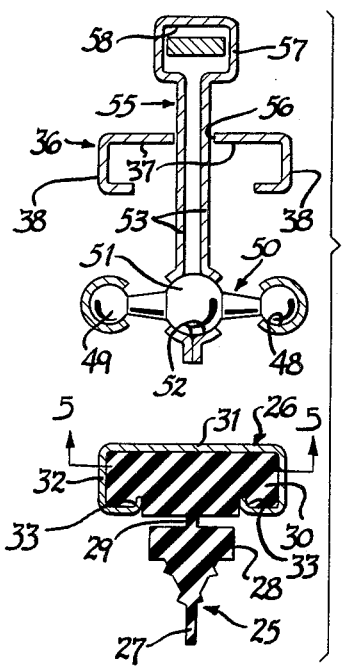
FIGURE 4 is an enlarged sectional view, with parts shown in elevation, taken along the plane 4—4 of FIGURE 1.
Figure 6:
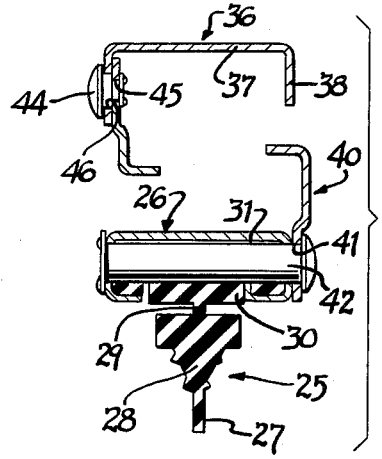
FIGURE 6 is an enlarged sectional view taken along the plane 6—6 of FIGURE 1.

The wiper 20 comprises an elastomeric wiping element 25 having secured thereto a carrier element 26 best illustrated in FIGURES 4 and 6. The wiping element 25 has a lower, relatively thin wiping edge 27 joined through a thickened medial portion 28 and a relatively thin hinge section 29 to an upper retaining section 30 which is generally rectangular in cross-section.

The carrier element 26 is preferably formed of sheet metal, such as stainless steel, and comprises an upper plate portion 31 of substantially greater width than thickness overlying the upper surface of the retaining portion 30 of the wiping element 25 and provided with downturned, spaced fingers 32 having their lower free ends inturned, as at 33 to securely interlock the carrier element 26 and the wiping element 25. By virtue of the separated finger portions 32 and the relatively thin stock from which the carrier element is made, the carrier element is relatively flexible in planes normal to the surface of the windshield 21, but is relatively inflexible in planes parallel to the surface of the windshield 21. Thus, the carrier element 26 is capable of stabilizing the wiping element 25 as it is moved across the surface of the windshield 21 while at the same time accommodating conformation of the lower wiping edge portion 27 of the wiping element to the windshield surface, in a manner to be hereafter more fully described.

As best illustrated in FIGURES 2 and 3, the terminal depending fingers 32 of the carrier element 26 are provided with laterally inwardly extending recesses 34 into which project laterally inturned fingers 35 formed at the terminal ends of the rigid backing member 36. As best illustrated in FIGURES 4 and 6, this rigid backing element 36 is stamped element of generally inverted U-shape having an upper central bight portion 37 and laterally spaced, depending legs 38.

From FIGURE 1, it will be noted that the backing element 36 is bowed in side elevation so that the depending terminal portion 39 thereof provided with the terminal fingers 35 can be received within the recesses 34 with the medial portion of the backing member being elevated above the medial portion of the carrier element 26.

Figure 5:
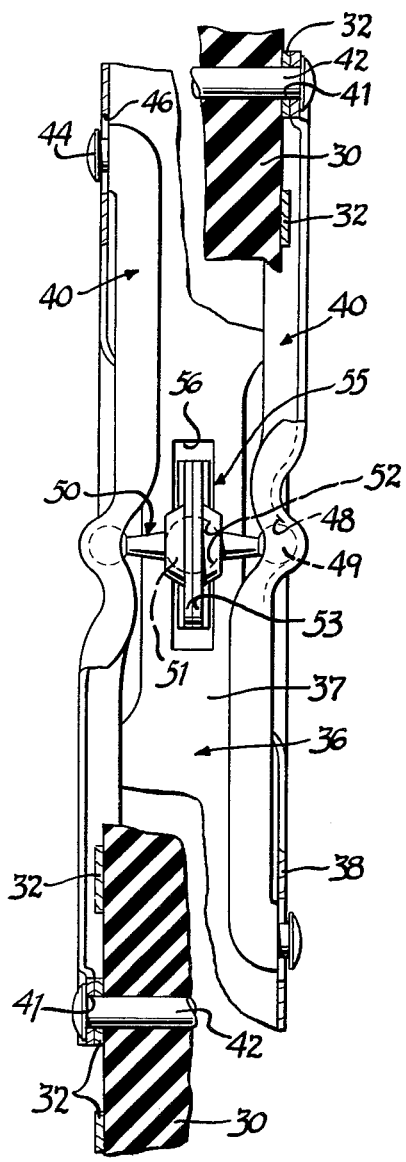
FIGURE 5 is an enlarged sectional view, with parts broken away, taken along the plane 5—5 of FIGURE 1.

The backing element 36 and the carrier element 26 are interconnected by means of a pair of identical cross arms indicated generally at 40 and best illustrated in FIGURES 1 and 5. These cross arms are preferably stamped to a U-shaped cross-sectional configuration for structural rigidity, and one end of each such arm 40 is apertured, as at 41 (FIGURES 5 and 6), to receive therethrough a rivet 42 pivotally connecting the end of the arm 40 to the adjacent finger 32 of the element 26, the finger 32 being also apertured to receive the rivet 42. The other end of each arm 40 is slidably connected to the element 36, as by means of a rivet 44 received in an arm aperture 45 (FIGURE 6) and received in elongated slots 46 formed in the side flanges 38 of the member 36. Thus, one end of each of the cross arms 40 is slidably secured to the backing element 36, while the other end of each such cross arm 40 is pivotally connected to the carrier element 26.

From FIGURE 5, it will be noted that the medial portions of the cross arms 40 are contoured to provide a central concave bearing seat 48 in which is seated a spherical end surface 49 formed on a bearing element 50 interposed between the two arms 40. This bearing element 50 is also provided with a central spherical bearing surface 51 (FIGURES 4 and 5). This central spherical bearing portion 51 is confined within a corresponding, partially spherical seat provided by arcuate surfaces 52 defined at the depending legs 53 of a connector element indicated generally at 55 and projecting through a central aperture 56 located medially of the support element 36.

This connector element 55 is formed from sheet metal and includes an upper hollow, generally rectangular portion 57 integral with the legs 53 and enclosing a recess 58 adapted to receive the free end 59 of the wiper arm 23. As is conventional, the free end 59 of the wiper arm 23 is provided with an upwardly projecting attachment button 60 which is trapped in the connector recess 58 by means of a rubber roller 61 carried by the connector and contacting the underside of the arm to urge the arm upwardly against a plate portion 62 of the connector, the space between the roller and the plate portion 62 being insufficient to accommodate passage of the arm 59 and the button 60 thereof unless the rubber is distorted. Thus, the rubber roller 61 effectively traps the button 60 behind the plate portion 62 to firmly interconnect the arm and the blade structure 20.

The operation of the embodiment of the invention of FIGURES 1 through 6 will be readily appreciated. The normal spring force urging the arm 23 toward the surface of the windshield 21 is imposed by means of the connector 55 upon the center spherical bearing surface 51 by means of the connector side plates 53 and the partial spheriodal seat surfaces 52 formed thereon. This load is then transmitted by the bearing element 50, particularly by the spherical end projections 49 thereon through the seat 48 of the cross arms 40. A portion of this load is then transferred directly through the lower ends of the arms to the carrier element 26 to the wiping element 25 to urge the wiping edge 27 against the windshield surface. The remainder of the force acts through the upper ends of the arms to pull the main structural or backing element 36 toward the surface of the windshield 21, the main structural member acting through its projections 35 to displace the ends of the backing element 26 and the wiping element 25 carried thereby against the windshield surface.

The importance of the central spherical bearing element 50 will be readily appreciated by a comparison of FIG- URES 5, 7 and 8 and by a study of FIGURES 9 through 16. When the wiping edge portion 27 of the wiping element contacts the surface of the windshield 21 at a flat portion thereof, as illustrated in FIGURE 1 of the drawings, the blade structure is in the condition illustrated in FIGURES 4 and 5 of the drawings, the wiping edge 27 being substantially planar and the universal bearing element 50 lying parallel to the glass surface.

When the wiping edge 27 contacts a curved portion of the blade, the wiping edge 27 is no longer planar, but is forced against the curved surface by the force of the arm 23 acting through the bearing 50. Now the condition of FIGURES 7 and 8 prevails, in that the distance between the backing element 26 and the main structural element 36 is less at the curved portion, this dispacement of the corresponding lower end of the one link 40, in effect, moving the pivot point backward relative to the universal bearing element 50, this backward movement placing the center of the spherical surface 49 of the one bearing at the location indicated at A in FIGURE 8 of the drawings as compared with the normal position of the center of the bearing surface 49, as indicated at B in FIGURE 8.

Thus, the center of the one bearing surface 49 has been moved rearwardly about the center point C of the center spherical bearing surface 51 through the angle indicated at D in FIGURE 8. Since the bearing element 50 is rigid, this same angular displacement D must occur at the other spherical bearing surface 49, the center point of this bearing surface 49 being moved in the opposite direction and through the same angle. Thus, the universal bearing element 50 cocks or moves arcuately to accommodate the effective different lengths of the cross arms 40 caused by the fact that the wiping edge 27 must conform to the arcuate surface of the curved windshield surface 21. The two points defined by the ends of the cross arms 40 secured to the carrier element 26 define a straight line having a length which is the actual chordal distance spanned by the wiper element 26. Similarly, the distance between the end projections 35 of the structural member 36 is the chordal distance rather than the arcuate distance traversed by the wiping edge, this difference in distance being accommodated by the slots 34 by means of which the ends of the main structural elements are connected to the wiper element support member 26. The same relative displacement of the bearing element will occur upon any change in the distance between the points of cross-arm-to-element 26 attachment or backing element-to-element 26 attachment as the carrier element 26 and the wiping element 25 conform to the curved windshield surface 21.

Figure 9:
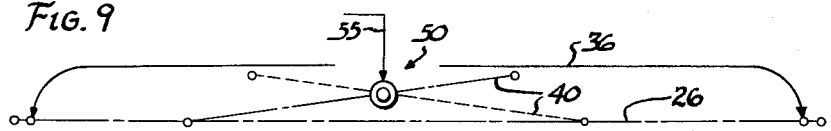
FIGURES 9 through 16 are schematic illustrations of the balde of FIGURES 1 through 8 shown in different operative positions conforming to different configurations of curved windshields.
Figure 10:
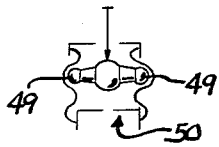
Figure 11:
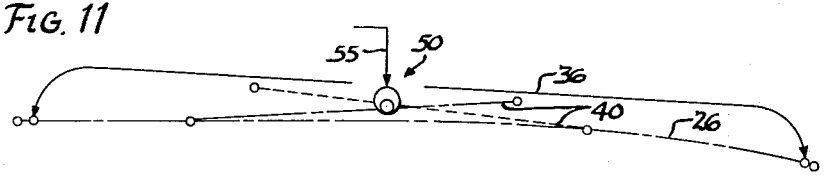
Figure 12:
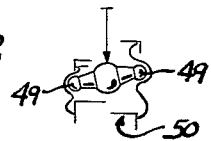
Figure 13:
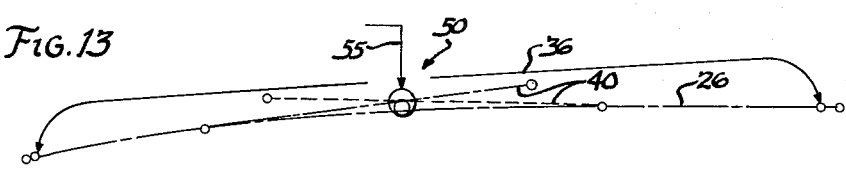
Figure 14:
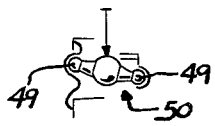
Figure 15:
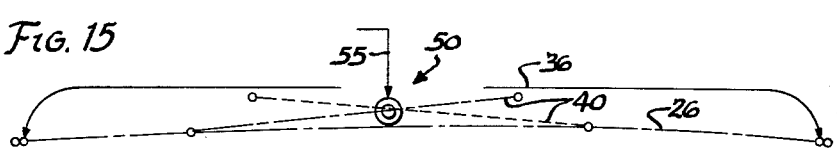

This same action is illustrated schematically in FIGURES 9 through 16 of the drawings. In FIGURE 9 of the drawings, the blade is in its condition illustrated in FIGURE 1, wherein the wiping edge contacts a planar surface and the longitudinal axis of the universal bearing is parallel to this planar surface. In FIGURE 11 of the drawings, the right-hand side of the wiping edge contacts a radically arcuate section of the windshield surface while the left-hand portion of the wiping element is still in contact with a planar portion of the surface. Because of the difference in the distance to be traversed at the arcuate surface in comparison with the distance of the planar surface, the one end of the spherical bearing is elevated while the other end of the bearing is depressed. This action is reversed when the other portion of the blade contacts the arcuate surface, as best illustrated in FIGURE 13 of the drawings. Where the entire surface contacted by the wiping edge is of uniform curvature, the bearing is not tilted and occupies the relative positions illustrated in FIGURES 15 and 16.

Figure 16:
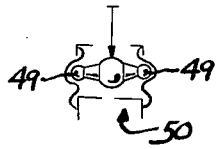

In that embodiment of the invention illustrated in FIGURES 16 through 18 of the drawings, the main structural element 60 is formed from bar stock to an overall arcuate configuration and has its ends notched, as at 61, to be received within upstanding apertured ears 62 formed at the remote ends of the backing element 63 which is substantially identical with the backing element 26 heretofore described.

The cross arms 65 have their upper ends pivotally connected to the main structural member 60, as at 66, the main structural member being merely apertured to receive the tabbed ends 64 of the cross arms therethrough. The lower ends of the cross arms 65 are notched, as at 67, to be received by apertured ears 68 also caried by the backing member 63.

Thus, it will be seen that a simplified structure is provided slidably interconnecting the main structural member 60 and the backing element 63 and the lower ends of the cross arms 65 and the backing member 63, while the upper ends of the cross arms are merely pivotally connected, as at 66, to the main structural member 60.

Interposed between the cross arms is a stamped bearing element 70 (FIGURE 18) having planar end portions 71 projecting through enlarged slots 72 formed medially of the cross arms and having a central dished portion providing a segmental spherical inner bearing surface 73 contacted by an abutment surface 74 on depending connector plates 75 corresponding to the plates 53 as heretofore described in connection with the embodiment of FIGURES 1 through 15.

The concave bearing surface 73 thus forms a partial spherical bearing surface which is interposed between and interconnected with the cross arms 65 while eliminating the relatively expensive, multispherical bearing surfaces required in the embodiment of FIGURES 1 through 16 heretofore described. The operation of the device of FIGURES 17 and 18 is substantially the same as that previously described in conjunction with FIGURES 1 through 16. The simple, stamped, partial spherical surface 73 accommodates the relative arm displacement necessary to conformation of the edge 27 to the windshield surface.

The plastic embodiment of windshield wiper of FIGURES 20 through 42 includes an elastomeric wiping element 100 whose cross sectional configuration is best shown in FIGURES 22 through 24. Wiping element 100 is formed with a relatively thin wiping edge 102 which is joined to a thickened medial portion 104 from which an upper mounting section 106 of generally T-shaped cross section projects to constitute a combined hinge and retaining section.

An elongate carrier element 108 is formed from a suitable plastic material by molding with an elongate web 110 having a series of downwardly projecting opposed hook-shaped legs 112 integrally formed on the web. As best seen in FIGURES 22 and 23, legs 112 are adapted to grip and retain the mounting section 102 of wiping element 100. Referring briefly to FIGURE 20, legs 112 are not continuous throughout the length of carrier element 108, but are formed as a plurality of longitudinally spaced individual projections. Web 108 is formed with a series of rectangular openings 114 (FIGURE 22) which pass completely through the web, the width of the rectangular openings 114 being shown in FIGURE 22. The length of openings 114 is substantially the same as the longitudinal extent of an individual leg 112, and as indicated in FIGURES 22 and 23, openings 114 and projections 112 are longitudinally offset from each other. The longitudinal spacing of legs 112 from each other, combined with the openings 114 through web 108 result in a carrier element which is flexible within a central longitudinally extending general plane—i.e., a vertical plane as viewed in FIGURES 22 through 24, but which is at the same time substantially rigid or inflexible against flexing movement transversely of the longitudinal plane—i.e., horizontally as viewed in FIGURES 22 through 24. This construction permits the carrier element to flex easily to conform to the curved surface of the windshield while maintaining sufficient transverse rigidity.

Referring now to FIGURES 28 through 35, and particularly to FIGURE 28, carrier element 108 is formed at one end with a pair of upstanding integral projections 116 and 118 which cooperatively define a concave cylindrical seat 120 which receives and retains a complementary cylindrical pivot portion 122 integrally formed on one end of a plastic backing member designated generally 124. As best seen in FIGURES 29 and 30, projection 116 is formed with a central slot 126 which loosely receives a radially projecting web portion 128 integrally formed on backing member 124. When the backing member and carrier member are in their assembled positions, web 128 projects into slot 126 to axially retain cylindrical portion 122 within seat 120.

At the opposite end of carrier member 108, (FIG. 31) a generally similar pair of projections 130 and 132 are formed to provide a cylindrical seat 134 similar to seat 120. Seat 134 pivotally receives one end of a link designated generally 136 which may be formed from a suitable plastic material. Referring particularly to FIGURES 34 and 35, link 136 includes a central web 138 terminating at either end in cylindrical enlargements 140 and 142. An integral retaining web 144 projects perpendicularly from one side of web 138 and is extended partially around the central circumference of both cylindrical sections 140 and 142. A cylindrical seat 146 is formed on the adjacent end of backing member 124 to receive cylindrical portion 142 of link 136. As was the case with projections 116, slots are provided in the respective seats 134 and 146 to receive retaining web 144 to axially lock carrier member 108, link 136 and backing member 124 to each other when the parts are in their assembled position.

Link 136 accommodates longitudinal movement of carrier element 108 relative to backing member 124, this longitudinal movement occurring as the carrier element is flexed into curved configurations by the windshield 21. Thus, link 136 performs the function of the elongate slot 34 of the FIGURE 1 embodiment.

Backing member 124 is a one-piece element of molded plastic material having an elongate generally bow-shaped configuration in side elevation and, as best seen in FIGURE 26, having a transverse cross section of a general inverted U-shaped configuration. Transversely extending stiffening ribs 150 are provided at suitable locations in order to achieve the desired degree of rigidity in the completed backing member. Approximately midway of its length, an enlargement 152 is formed by outwardly expanding the side and top walls of the member to provide clearance for certain elements of a cross arm assembly to be described below.

Backing member 124 is formed with a centrally located slot 154 which extends longitudinally of the backing member to provide a clearance opening through which a connector assembly designated generally 156 passes from wiper arm 23 to a universal bearing element 158.

Referring to FIGURES 36 through 40, connector element 156 is constructed as a one-piece element of molded plastic material having a transversely thickened upper body portion 160 and an integral downwardly projecting web 162. As best seen in FIGURE 39, upper body portion 160 is formed with a longitudinally extending recess 164 of a size and shape adapted to snugly receive the end of wiper arm 23. Arm 23 is formed with an upset button 166 and the upper and one side wall of body portion 160 are cut through to recess 164 to form an integral resilient arm 168 which snaps down behind button 166 as best seen in the cross section of FIGURE 39 to retain the connector upon the end of the wiper arm.

The lower end of web 162 is slotted as at 170 to divide the lower portion of the web into two opposed legs 172 and 174. A bearing surface in the form of a portion of a concave spherical surface 176 is formed on the opposed inner sides of the legs and an upwardly extending radial slot 178 extends upwardly into the bearing surface to provide clearance for the opposed arms of the bearing member 158. By regulating the spacing between legs 172 and 174 and the depth of slot 170, the legs may be adapted to grip the central spherical surface of bearing 158 with the desired degree of resiliency.

As was the case with the previously described embodiments, bearing 158 includes a relatively large diameter central spherical section 180 from which project two diametrically opposed arms 182 which terminate at their outer ends in relatively small diameter spherical bearings 184. In the present embodiment, spherical bearing 158 may be molded from a suitable plastic material and each of the outer or small diameter spherical portions 184 are received within a spherical recess 186 formed in a coupling element 188 which is likewise formed from molded plastic.

Coupling elements 188 serve to couple one of a pair of cross links 189 to bearing 158. As best seen in FIGURES 41 and 42, coupling 188 is a one-piece element which includes a main body portion 190 within which spherical seat 186 is formed. A pair of inclined slots 192 are formed on opposite ends of body 190 to define a pair of resilient cantilevered arms 194 which project outwardly somewhat from the opposite ends of the body as best seen in FIGURE 40. On the opposite sides of body 190 from arms 194, outwardly projecting curved flanges 196 are formed.

Each cross link 189 is formed with a generally rectangular opening 198 having a length substantially equal to the length of body portion 190 and having a width substantially equal to the thickness of body 190. The connector and bearing 158 is assembled to each cross link 189 as follows.

The connector 188 is first assembled on the small diameter spherical portion 184 of the bearing assembly by pushing connector 188 onto the bearing. The connector with the bearing assembled thereon is then moved toward opening 198 in the cross arm from the inner side of the cross arm so that the cantilevered arms 194 of connector 188 pass through opening 198 first. The dimensions of slots 192 are such that arms 194 can flex inwardly of the connector as the connector passes through opening 198 and when the arms clear the opposite side of cross link 189, arms 194 resiliently flex outwardly into the position shown in FIGURE 27. At this time, the curved flanges 196 on the opposite side of the connector have seated against the inner surface of the cross arm, so that the flanges 196 and arms 194 engage the opposite sides of cross link 189 to retain connector 188 in position upon the cross link.

In the present embodiment, cross links 189 are the only elements of the assembly which are not constructed of molded plastic material. Cross links 189 are preferably fabricated from stainless steel and are each pivotally connected at one end to backing element 124 as at 200. The pivotal connection may (see FIGURE 26) take the form of a simple T-shaped offset 202 on the arm which is pivotally received within an opening 204 through the web of backing member 124, opening 204 being provided with diametrically extending slots to pass the T-shaped offset portion, the slots extending in a direction not normally assumed by the T-shaped offset during operation of the wiper. The opposite ends of cross links 189 are coupled to carrier member 108 at spaced points for a combined pivotal and sliding movement relative to the carrier member by an integral projection 206 on the carrier member which is formed with an opening 208 complementary in shape to the cross section of the appropriate portion of cross link 189.

The operation of the embodiment of FIGURES 20 through 41 is substantially similar to that of the previously described embodiments with the exception that flexing movement of carrier element 108 is accommodated by the pivotal connection 120–122 which couples one end of the carrier member 108 to backing member 124 and the pivotal connections at the opposite ends of link 136 which couple the opposite ends of the carrier and backing members to each other. Carrier member 108, backing member 124 and link 136 are in effect a closed pivotally constrained three-bar linkage in which one link, namely, carrier element 108, is flexible. This three-bar linkage arrangement is particularly well adapted for plastic materials because the pivotal interconnections are readily formed in the molding of the individual elements.

With the exception of cross arms 189, and the elastomeric wiping element 100, all of the individual components of the embodiment of FIGURE 20–42 may be made of a molded plastic material such as nylon or an acetal resin (such as that sold by E. I. du Pont de Nemours & Co. under the trademark Delrin).

From the foregoing, it is seen that three exemplary embodiments of the invention have been set forth. Each embodiment includes an elongate flexible wiper carrier element and a rigid bow-like backing element which are coupled to each other in a manner such that at least one end of the carrier element can shift longitudinally of the rigid backing element to accommodate flexing of the carrier element. In each case, a cross link assembly is interconnected between the backing element and carrier element and in turn the cross links are connected to each other for universal rotation. The coupling of the wiper assembly in turn is made through a universal connection to the universal bearing which couples the cross links to each other so that the rigid backing element in each case is a floating element which serves as a rigid reference through which flexing of one longitudinal portion of the carrier element is transmitted and distributed longitudinally of the carrier element.

I claim:

1. In a windshield wiper blade assembly having an elastomeric wiping element supported by a carrier element to traverse a windshield, the carrier element being flexible in planes normal to the windshield surface and relatively inflexible in planes parallel to the windshield surface, a superstructure for interconnecting the carrier element to an oscillatable wiper arm, comprising a rigid backing element, means connecting the ends of the backing element to the carrier element for relative sliding movement, a pair of cross arms each having its ends connected to the backing element and the carrier element, respectively, for relative movement, one of said ends being slidable relative to the associated element, bearing means interconnecting said cross arms intermediate the ends thereof, said bearing means accommodating universal movement of the interconnected portions of the cross arms about a common, at least partially spherical bearing surface, and means for connecting the wiper arm to said bearing surface, the force of the arm urging the wiping element against the windshield thus being exerted on the blade solely through said bearing surface which supports the entire wiper blade assembly for movement relative to said arm.

2. A windshield wiper blade comprising a rigid backing member, a pair of cross arms respectively pivotally connected at one end to the backing member, an elastomeric wiping element, a flexible carrier for said wiping element, means slidably interconnecting said backing member and the other ends of said cross arms to said carrier, respectively, spherical bearing means located at the intersection of said cross arms and supporting the medial portions of said cross arms for relative movement, and means engaging said bearing means for urging the wiping element into wiping contact with a windshield.

3. In a windshield wiper blade assembly having an elastomeric wiping element supported by a carrier element to traverse a windshield, the carrier element being flexible in planes normal to the windshield surface and relatively inflexible in planes parallel to the windshield surface, a superstructure for interconnecting the carrier element to an oscillatable wiper arm, comprising a rigid backing element superimposed on the carrier element and having its ends slidably connected to the carrier element adjacent the ends thereof, a pair of cross arms, each such cross arm having one end thereof connected to the carrier element in spaced relation to the carrier element-backing element connection and its other end connected to the backing element, one of the ends of each cross arm being slidable relative to the associated element, segmental spherical bearing means interconnecting said cross arms intermediate the ends thereof, said bearing means accommodating movement of the interconnected portions of the cross arms about a common bearing surface, and means for connecting the wiper arm to said bearing surface independently of said backing element, said carrier element and said cross arms, the force of the arm urging the wiping element against the windshield thus being exerted on the blade solely through said bearing surface which supports the entire wiper blade assembly for movement relative to said arm.

4. A windshield wiper blade comprising a rigid backing member, a pair of cross arms respectively movably connected at one end to the backing member, an elastomeric wiping member, a flexible carrier for said wiping element, means movably interconnecting said backing member and the other ends of said cross arms to said carrier, respectively, said members and said arms being relatively slidable, bearing means located at the intersection of said cross arms and supporting the medial portions of said cross arms for relative pivotal movement, and means engaging said bearing means for urging the wiping element into wiping contact with a windshield, said last named means and said cross arms being movable about a common pivot center provided by said bearing means.

5. In a windshield wiper blade assembly having an elastomeric wiping element supported by a carrier element to traverse a windshield, the carrier element being flexible in planes normal to the windshield surface and relatively inflexible in planes parallel to the windshield surface, a superstructure for interconnecting the carrier element to an oscillatable wiper arm, comprising a rigid backing element, means connecting the ends of the backing element to the carrier element for relative sliding movement, a pair of cross arms each having its ends connected to the backing element and the carrier element, respectively, for relative movement, one of said ends being slidable relative to the associated element, bearing means pivotally interconnecting said cross arms itnermediate the ends thereof, said bearing means comprising an at least partially spherical central bearing surface and additional bearing projections pivotally engaging said cross arms, respectively, and means for connecting the wiper arm to said bearing surface.

6. In a windshield wiper blade assembly having an elastomeric wiping element supported by a carrier element to traverse a windshield, the carrier element being flexible in planes normal to the windshield surface and relatively inflexible in planes parallel to the windshield surface, a superstructure for interconnecting the carrier element to an oscillatable wiper arm, comprising a rigid backing element, means connecting the ends of the backing element to the carrier element for relative sliding movement, a cross arm linkage interposed between the backing element and the carrier element, and capable of at least limited sliding movement relative thereto, means connecting said cross arms to one another for relative movement about a common pivot center, and means connecting said wiper arm to said pivot center.

7. In a windshield wiper blade assembly having an elastomeric wiping element supported by a carrier element to traverse a windshield, the carrier element being flexible in planes normal to the windsield surface and relatively inflexible in planes parallel to the windshield surface, a superstructure for interconnecting the carrier element to an oscillatable wiper arm, comprising a rigid backing element, means connecting the ends of the backing element to the carrier element for relative sliding movement, an X-type linkage including a pair of links interconnecting the backing element and the carrier element, respectively, and capable of at least limited sliding movement relative thereto, bearing means interconnecting said links to accommodate relative link movement about a pivot center located between the backing element and the carrier element, and means also movable about said pivot center to impose upon the bearing means the force of the wiper arm urging the wiping element against the windshield surface by means of the linkage and the backing element.

8. A windshield wiper blade comprising a rigid backing member, a pair of intersecting links each pivotally connected at one end to the backing member, an elastomeric wiping element, a flexible carrier for said wiping element, means slidably interconnecting said backing member and the other ends of each of said links to said carrier, respectively, bearing means located at the intersection of said links and defining an at least partially spherical bearing surface, said bearing means supporting the medial portions of said links for relative movement concentrically about said bearing surface, and means engaging said bearing surface for urging the wiping element into wiping contact with a windshield.

9. In a windshield wiper blade assembly having an elastomeric wiping element supported by a carrier element to traverse a windshield, the carrier element being flexible in planes normal to the windshield surface and relatively inflexible in planes parallel to the windshield surface, a superstructure for interconnecting the carrier element to an oscillatable wiper arm, comprising a rigid backing element, means connecting the ends of the backing element to the carrier element for relative sliding movement, a pair of links interconnecting the backing element and the carrier element, respectively, and capable of at least limited sliding movement relative thereto, bearing means interconnecting said links to accommodate relative movement about a pivot center located between the backing element and the carrier element, and means also movable about said pivot center to impose upon the bearing means the force of the wiper arm, the links pulling the backing element and the ends of the carrier element toward the windshield and the links directly pushing the center portion of the carrier portion toward the windshield to distribute the total load imposed on the bearing means over the length of the wiping element.

10. In a windshield wiper blade assembly having an elastomeric wiping element supported by an elongate carrier element to traverse a windshield, said carrier element being flexible within a longitudinally extending general plane and relatively inflexible transversely of said general plane, a superstructure for interconnecting the carrier element to an oscillatable wiper arm comprising an elongate rigid bow-like backing element, means coupling the opposite ends of said carrier element to the opposite ends of said backing element, a pair of rigid links pivotally mounted on one element at spaced locations on opposite sides of the longitudinal midpoint of said one element and coupled to the other element for combined pivotal and longitudinal sliding movement at spaced locations on opposite sides of the longitudinal midpoint of the other element, said links crossing each other in transversely spaced relationship between said elements, bearing means coupling the cross links to each other intermediate their ends for universal angular movement about a center located transversely between the cross links, and means for mounting said bearing means on a wiper arm with said center disposed in fixed relationship to said wiper arm.

11. A windshield wiper blade assembly adapted to be urged against and driven in wiping movement across a curved windshield surface by a wiper arm, said assembly comprising spherical bearing means, means for supporting said spherical bearing means on the wiper arm to apply the force urging said assembly against the windshield to said spherical bearing means, a pair of cross links pivotally mounted intermediate their ends upon said bearing means for universal angular movement about said spherical bearing means, an elongate flexible wiper carrier coupled at spaced points to one end of each cross link and extending between and longitudinally outwardly beyond the one end of said links, and means coupling the other ends of said cross links to each other and to the opposite ends of said carrier for longitudinally distributing the force applied by the wiper arm to the spherical bearing means along said carreir element upon flexing of said carrier element caused by its engagement with the curved windshield surface.

12. A windshield wiper assembly comprising an elongate wiper carrier member of molded plastic material flexible within a longitudinal general plane and relatively inflexible transversely of said general plane, an elongate substantially rigid backing member of molded plastic material, first pivot means coupling one end of said backing member to one end of said carrier member for pivotal movement about a first axis perpendicular to said general plane, a relatively short link member of molded plastic material, second pivot means coupling one end of said link member to the other end of said carrier member for pivotal movement about a second axis parallel to said first axis, and third pivot means pivotally coupling the other end of said link member to the other end of said backing member for pivotal movement about a third axis parallel to said first axis to accommodate flexing of said carrier member, each of said pivot means comprising an integral molded projection on one member pivotally received within a complementary recess in the other member.

13. A wiper assembly as defined in claim 12 wherein said projection is of cylindrical shape, a web integral with said projection and projecting radially therefrom, and means on the other member defining a web receiving slot extending radially from the recess to receive said web when said members are assembled to retain the members against axial movement of the cyindrical projection within the recess.

14. A windshield wiper assembly adapted to be mounted on a wiper arm comprising an elongate wiper carrier member flexible within a longitudinal general plane and relatively inflexible transversely of said general plane, an elongate rigid bow-like backing member, first pivot means coupling one end of said backing member to one end of said carrier member for pivotal movement relative to each other about a first axis perpendicular to said general plane, a relatively short rigid link member, second pivot means coupling one end of said link member to the other end of said carrier member for pivotal movement about a second axis parallel to said first axis, third pivot means pivotally coupling the other end of said link member to the other end of said backing member for pivotal movement about a third axis parallel to said first axis to accommodate flexing movement of said carrier member, a pair of crossed links pivotally connected at spaced points to said backing member for pivotal movement about axes parallel to said first axis and coupled at spaced points to said carrier member for sliding movement parallel to said general plane and for pivotal movement about axes parallel to said first axis, means pivotally interconnecting said crossed links to each other intermediate their ends for universal pivotal movement relative to each other, and means mounted on said last mentioned means for coupling said assembly to the wiper arm.

15. A windshield wiper assembly comprising an elongate wiper carrier member flexible within a longitudinally extending generally plane and relatively inflexible transversely of said general plane, an elongate rigid bow-like backing member, and a relatively short rigid link member, said members being of a molded plastic material and each having integrally formed complementary pivot projections at each end thereof coupling said members to each other for pivotal movement about axes perpendicular to said general plane, a closed pivotally constrained three-bar linkage, a pair of cross links each coupled at opposite ends to said carrier member and said backing member for pivotal movement about axes perpendicular to the general plane and for sliding movement relative to one of said members within said general plane, universal bearing means coupling said cross links to each other intermediate their ends, and wiper arm connector means coupled to said universal bearing means.

16. A windshield wiper assembly comprising a wiper arm connector adapted to be mounted upon a wiper arm, a first spherical bearing member rotatably mounted on said connector, a pair of diametrically opposed arms projecting outwardly from opposite sides of said first bearing member, each of said arms terminating in a second spherical bearing member, a pair of cross links, means intermediate the ends of each cross link rotatably mounting the link on one of said second bearing members, an elongate flexible wiper carrier member, first means coupling said carrier member at spaced points intermediate the ends of said carrier member to one of each cross link, an elongate rigid bow-like backing member, second means coupling said backing member at spaced points intermediate the ends of said backing member to the opposite ends of said cross links, both of said first and second coupling means coupling the links to the members for relative pivotal movement and one of said first and second coupling means also accommodating longitudinal sliding movement between the links and member, and means connecting the opposite ends of said carrier member to the respective ends of said backing member to permit longitudinal movement of at least one end of said carrier member relative to said backing member to accommodate flexing of said carrier member.

17. A windshield wiper assembly comprising a wiper arm connector adapted to be mounted upon a wiper arm, a first spherical bearing member rotatably mounted on said connector, a pair of diametrically opposed arms projecting outwardly from opposite sides of said first bearing member, each of said arms terminating in a second spherical bearing member, a pair of cross links, means intermediate the ends of each cross link rotatably mounting the link on one of said second bearing members, an elongate wiper carrier member flexible in a longitudinal general plane and substantially inflexible transversely of said general plane, first means coupling said carrier at spaced points intermediate the ends of said carrier to one end of each cross link for pivotal and longitudinal sliding movement relative thereto, an elongate rigid bow-like backing member, second means coupling said backing member at spaced points intermediate the ends of said backing member to the opposite ends of said cross links for pivotal movement relative thereto, pivot means connecting one end of said carrier to one end of said backing member, and a link pivotally connected at opposite ends to the opposite ends of said carrier member and said backing member to permit longitudinal movement of said carrier member relative to said backing member to accommodate flexing of said carrier member.

References Cited by the Examiner
UNITED STATES PATENTS

| 2,702,397 | 2/1955 | Oishei | 15—250.42 |
| 3,128,491 | 4/1964 | Reese | 15—250.42 |
| 3,131,414 | 5/1964 | Wise | 15—250.42 |

FOREIGN PATENTS

| 1,090,122 | 9/1960 | Germany. |
| 433,467 | 8/1935 | Great Britain. |

References Cited by the Applicant
UNITED STATES PATENTS

| 3,022,532 | 2/1962 | Zaiger. |

WALTER A. SCHEEL, *Primary Examiner.*

UNITED STATES PATENT OFFICE
CERTIFICATE OF CORRECTION

Patent No. 3,218,664            November 23, 1965

Ralph H. Wise

It is hereby certified that error appears in the above numbered patent requiring correction and that the said Letters Patent should read as corrected below.

Column 10, line 49, for "itnermediate" read -- intermediate --; line 72, for "windsield" read -- windshield --; column 11, line 39, before "movement" insert -- link --; column 12, line 11, for "carreir" read -- carrier --; column 13, line 23, after "one" insert -- end --.

Signed and sealed this 2nd day of August 1966.

(SEAL)
Attest:

ERNEST W. SWIDER            EDWARD J. BRENNER
Attesting Officer            Commissioner of Patents